(12) United States Patent
Schneider et al.

(10) Patent No.: US 10,414,370 B2
(45) Date of Patent: Sep. 17, 2019

(54) DRIVER AIRBAG FOR OBLIQUE AND FRONTAL IMPACTS

(71) Applicant: AUTOLIV ASP, INC., Ogden, UT (US)

(72) Inventors: David Schneider, Waterford, MI (US); Christina Morris, Auburn Hills, MI (US); James Jacobson, Waterford, MI (US)

(73) Assignee: AUTOLIV ASP, INC., Ogden, UT (US)

( * ) Notice: Subject to any disclaimer, the term of this patent is extended or adjusted under 35 U.S.C. 154(b) by 3 days.

(21) Appl. No.: 15/623,629

(22) Filed: Jun. 15, 2017

(65) Prior Publication Data

US 2018/0361979 A1 Dec. 20, 2018

(51) Int. Cl.
| | |
|---|---|
| *B60R 21/203* | (2006.01) |
| *B60R 21/231* | (2011.01) |
| *B60R 21/235* | (2006.01) |
| *B60R 21/2338* | (2011.01) |
| *B60R 21/00* | (2006.01) |

(52) U.S. Cl.
CPC ........ *B60R 21/203* (2013.01); *B60R 21/2032* (2013.01); *B60R 21/231* (2013.01); *B60R 21/235* (2013.01); *B60R 21/2338* (2013.01); *B60R 2021/0004* (2013.01); *B60R 2021/0009* (2013.01); *B60R 2021/23382* (2013.01)

(58) Field of Classification Search
CPC . B60R 21/203; B60R 21/2032; B60R 21/205; B60R 21/231; B60R 21/235; B60R 2021/0004; B60R 2021/0009; B60R 2021/0023; B60R 2021/23571; B60R 21/2338; B60R 2021/23382
See application file for complete search history.

(56) References Cited

U.S. PATENT DOCUMENTS

| | | | | |
|---|---|---|---|---|
| 4,771,650 | A | * | 9/1988 | Kerner ................ B60R 21/2032 280/731 |
| 5,316,337 | A | * | 5/1994 | Yamaji .................. D05B 39/00 280/728.1 |
| 7,360,791 | B2 | * | 4/2008 | Yamada ................ B60R 21/233 280/731 |
| 7,922,198 | B2 | * | 4/2011 | Urushibata ........... B60R 21/235 280/728.1 |

(Continued)

FOREIGN PATENT DOCUMENTS

| | | |
|---|---|---|
| GB | 2 237 248 A | 5/1991 |
| GB | 2 498 439 B | 7/2016 |
| JP | 5026026 | 9/2012 |

*Primary Examiner* — Laura Freedman
(74) *Attorney, Agent, or Firm* — Brinks Gilson & Lione

(57) ABSTRACT

An airbag includes a first panel and a second panel. A first wing is formed with one of the first panel and the second panel, the first wing being coupled to the other of the first panel and the second panel. At least a second wing is formed with one of the first panel and the second panel, the second wing being coupled to the other of the first panel and the second panel. The airbag includes a first depth that extends from the first panel to the second panel proximate the first wing and the second wing when the airbag is in the deployed position and at least a second depth extending from the first panel to the second panel proximate the first base, wherein the second depth is less than the first depth.

16 Claims, 7 Drawing Sheets

(56) References Cited

U.S. PATENT DOCUMENTS

| | | | |
|---|---|---|---|
| 8,678,429 B2* | 3/2014 | Nagasawa | B60R 21/233 |
| | | | 280/729 |
| 8,720,941 B1* | 5/2014 | Svensson | B60R 21/233 |
| | | | 280/730.2 |
| 8,899,618 B2 | 12/2014 | Eckert et al. | |
| 9,676,355 B2* | 6/2017 | Kruse | B60R 21/0136 |
| 9,845,067 B2* | 12/2017 | Morris | B60R 21/233 |
| 2005/0017482 A1* | 1/2005 | Kreuzer | B60R 21/2032 |
| | | | 280/728.2 |
| 2006/0163848 A1* | 7/2006 | Abe | B60R 21/231 |
| | | | 280/729 |
| 2013/0181429 A1* | 7/2013 | Weng | B60R 21/203 |
| | | | 280/731 |
| 2016/0046253 A1* | 2/2016 | Jung | B60R 21/206 |
| | | | 280/729 |
| 2017/0129444 A1* | 5/2017 | Fukawatase | B60R 21/2338 |
| 2018/0361980 A1* | 12/2018 | Schneider | B60R 21/203 |

* cited by examiner

DRIVER AIRBAG FOR OBLIQUE AND FRONTAL IMPACTS

TECHNICAL FIELD

This disclosure relates to airbags for use in motor vehicles.

BRIEF SUMMARY

While previous driver side airbags, particularly those formed from a pair of fabric panels having an identical outline shape have generally proven effective, it has been found that modified three-dimensional shapes for the inflated airbag can enhance performance. For example, typical driver side airbags have a generally pillow shaped configuration and are rotationally symmetric about the steering wheel axis of rotation. Such airbags extend a distance from the steering wheel in the deployed position that is the same at an upper portion that corresponds to an area at which an occupant's head might impact the airbag and a lower portion at which an occupant's chest or torso might impact the airbag. The occupant's head, however, will travel a greater distance than the occupant's chest or torso before reaching the airbag and its controlled deceleration. Earlier engagement with the occupant's head and upper torso is believed to provide opportunities for enhanced occupant protection.

Therefore, there exists a need for a driver's-side airbag that will better accommodate an occupant's anatomy and occupant protection dynamic factors with a goal of reducing loads acting on the occupant's head and chest.

Embodiments of the disclosed invention include an airbag configured to be coupled to a steering wheel of a motor vehicle. A first panel extends from a first base with a first base width to a first top with a first top width greater than the first base width. A second panel extends from the first base to a second top with a second top width, the second top being coupled to the first top. A first wing is integrally formed with one of the first panel and the second panel, the first wing being coupled to the other of the first panel and the second panel. At least a second wing is integrally formed with one of the first panel and the second panel, the second wing being coupled to the other of the first panel and the second panel. The airbag defines a first depth that extends from the first panel to the second panel proximate the first wing and the second wing when the airbag is in the deployed position and at least a second depth extending from the first panel to the second panel proximate the first base, wherein the second depth is less than the first depth.

Another embodiment of an airbag is configured to be coupled to a steering wheel of a motor vehicle. A first panel extends from a first base with a first base width to a first top with a first top width greater than the first base width. The first panel defines a first centerline that extends between a first base midpoint of the first base width and a first top midpoint of the first top width. A second panel extends from the first base to a second top with a second top width, the second top being coupled to the first top. The second panel defines a second centerline that extends between the first base midpoint and a second top midpoint of the second top width. A first wing is coupled to the first panel and the second panel, the first wing extending a first wing distance laterally away from one of the first centerline and the second centerline, the first wing extending from the first base to whichever of the first top and the second top associated with the first centerline and the second centerline from which the first wing extends. At least a second wing is coupled to the first panel and the second panel, the second wing extending a second wing distance laterally away from one of the first centerline and the second centerline in a direction away from the first wing, the second wing extending from the first base to whichever of the first top and the second top associated with the first centerline and the second centerline from which the second wing extends.

Another embodiment of an airbag is formed from fabric panels that have a differing outline shape and is configured to be coupled to a steering wheel of a motor vehicle. A rear panel extends from a rear base with a rear base width to a rear top with a rear top width greater than the rear base width. The rear panel defines a rear centerline that extends between a rear base midpoint of the rear base width and a rear top midpoint of the rear top width. A first wing extends a first wing distance laterally away from the rear centerline in a first direction, the first wing extending from the rear top to the rear base. At least a second wing extends a second wing distance laterally away from the rear centerline in a second direction opposite the first direction, the second wing extending from the rear top to the rear base. A front panel extends from a front base with a front base width to a front top with a front top width. The front panel defines a front centerline that extends between a front base midpoint of the front base width and a front top midpoint of the front top width, a first side that extends from the front base to the front top, and a second side spaced apart from the first side, the second side extending from the front base to the front top. The front base is coupled to the rear base, the front top is coupled to the rear top, the first side is coupled to the first wing and the second side is coupled to the second wing.

Each embodiment of the present invention provides an asymmetric geometry top to bottom can be created by the difference in airbag panel width alternatively by providing a split at the bottom of the airbag. These shapes are be accomplished without requiring tethers or separate side panels to create the wedge shape (deep at top, shallow at bottom). The height of the split as well as the geometry (width, angles, non-inflated region) of the split, result in a reduced depth in the lower portion of the inflated airbag.

Other systems, methods, features and advantages of the invention will be, or will become, apparent to one with skill in the art upon examination of the following figures and detailed description. It is intended that all such additional systems, methods, features and advantages be within the scope of the disclosure, and be encompassed by the following claims.

DETAILED DESCRIPTION

Figure 1:
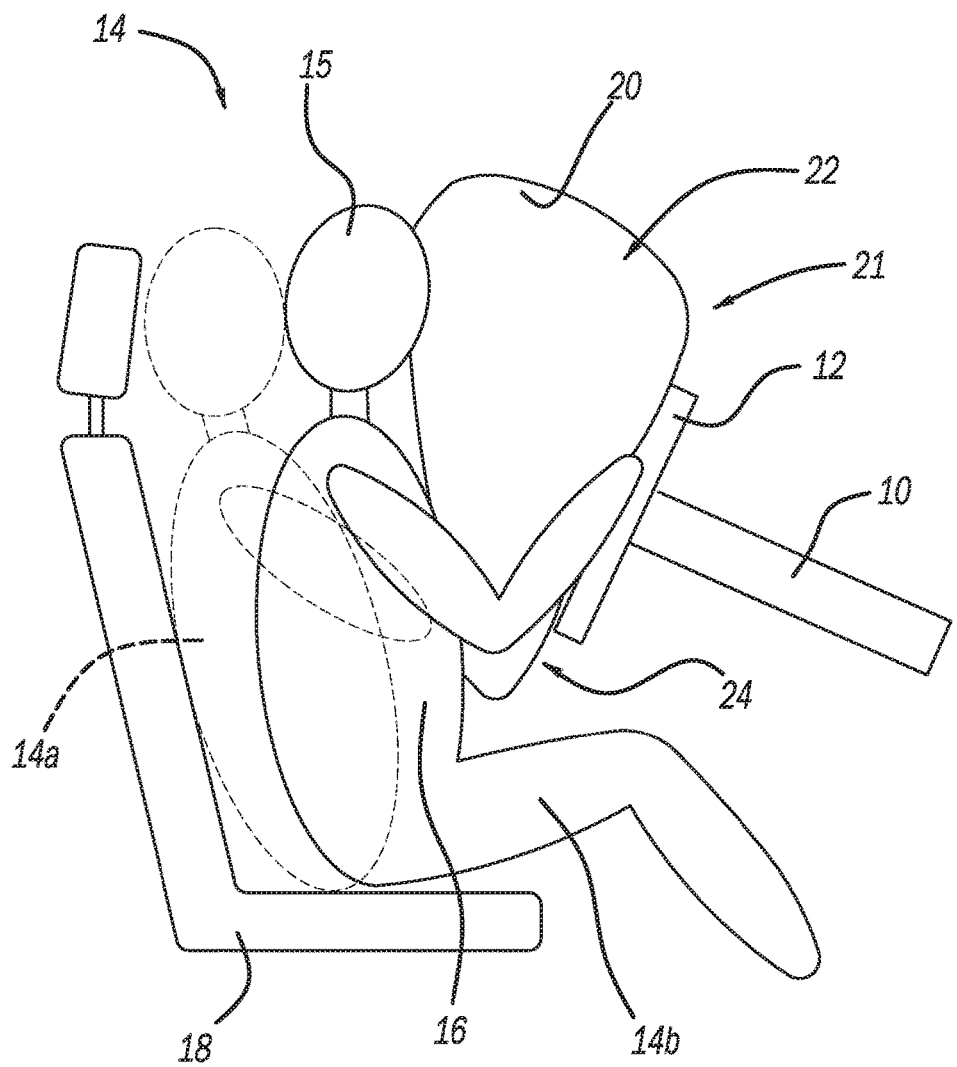
FIG. 1 is a side view of an occupant and an embodiment of the airbag in accordance with the present invention in a deployed position.

FIG. 1 illustrates an environment in which various embodiments of the invention are used. Illustrated is an interior portion of a motor vehicle that includes a steering column 10 and a steering wheel 12. Other components of the motor vehicle are omitted for clarity. Of course, embodiments of the invention may be used in any type of vehicle or application.

An occupant 14 of the motor vehicle is seated in a seat 18. The occupant 14 is illustrated in broken lines as he or she would appear in a normal position 14a and in unbroken or solid lines in a collision position 14b during which an airbag 20 is activated and as illustrated in the airbag's deployed position 21. During a collision sufficient to activate the airbag 20, the occupant's head 15 and chest or torso 16 may interact with one or more portions of the airbag 20. While the airbag 20 is illustrated for use in driver's position in a motor vehicle, the airbag 20 may be used in other seating positions of the motor vehicle, such as a passenger seat, rear seats, or for side impact protection (side and curtain airbags).

The airbag 20 has a wedge shape in which the airbag 20 has a greater depth or thickness at an upper portion 22 of the airbag 20 than at a lower portion 24 of the airbag. The airbag 20 with its wedge shape may advantageously provide earlier and greater restraint and reduced angular velocity of the occupant's head 15, which may reduce the head or brain injury criteria (BrIC) for a given collision. BrIC is a measure intended to be related to the likelihood that the occupant would suffer a head or brain injury during the collision.

As will be explained in greater detail below, the three-dimensional wedge shape of the airbag 20 is created with a single, panel or two or more panels of material coupled together at the periphery or the peripheral edges of the panel or panels. The depth, height, and width of the airbag 20 are controlled by varying the geometry of the single panel or one or more of the panels that form the airbag 20. In other words, and in contrast to previously the prior art, the construction of the airbag 20 does not require separate side panels to achieve the desired shape of the airbag 20 in its deployed position.

In addition, the wedge shape of the airbag, with the reduced depth at the lower portion 24, may result in less interaction, less loading, and less deflection of the chest 16 of the occupant 14. This, in turn, may reduce the risk of injury to the occupant's chest 16 during a collision.

FIGS. 2-5 illustrate various features of the airbag 20. The airbag 20 is formed from at least one and, in some embodiments, two or more panels. Thus, while reference will be made to two panels in the following discussion, it is to be understood that the two panels may simply refer to separate portions of a contiguous or integral panel. Further, the panel or panels may be symmetric or asymmetric about one or more axes.

Figure 5:
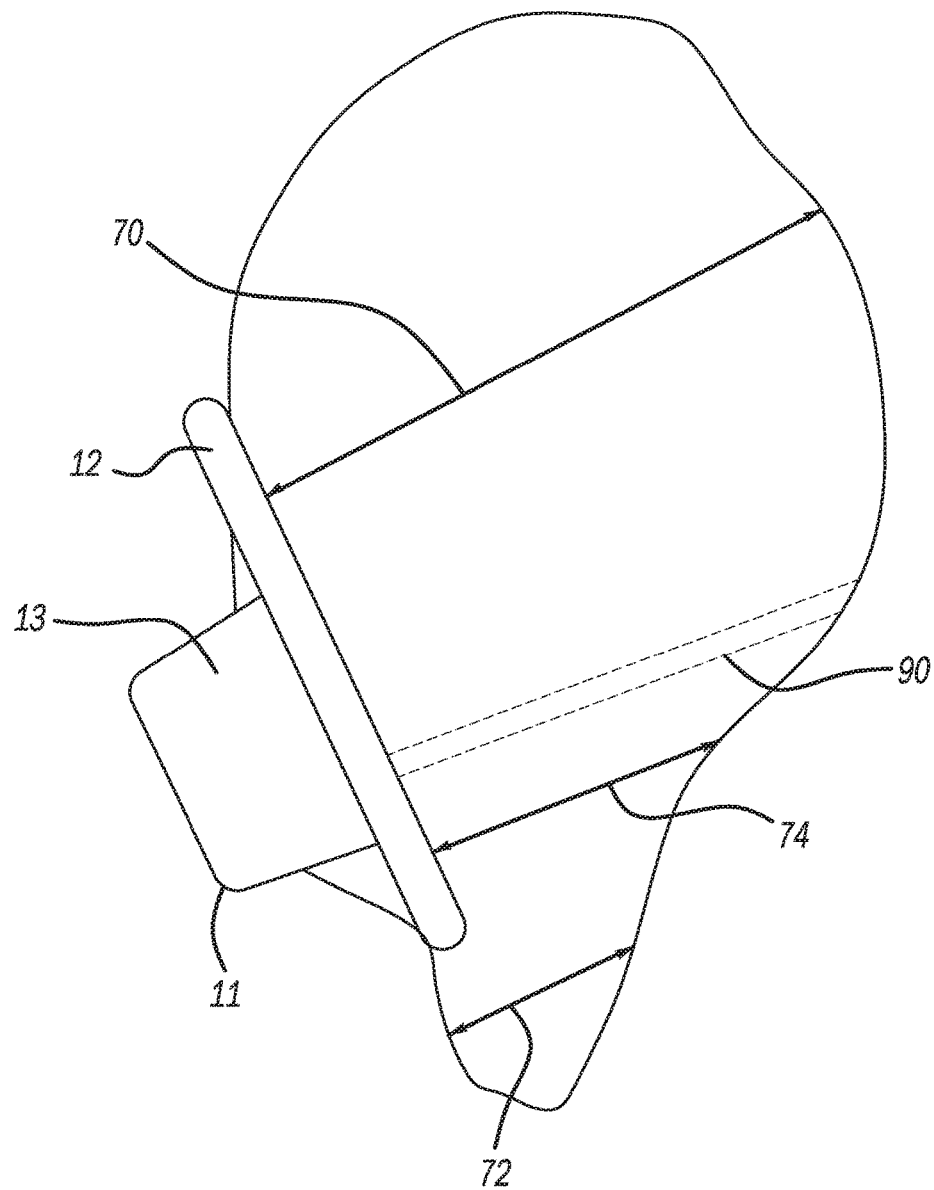
FIG. 5 is a side view of the airbag of FIG. 1 in a deployed position.

The airbag 20 in is configured to be coupled to a steering wheel 12 of a motor vehicle. Optionally, the airbag 20 is configured to be coupled to, housed, or stored in an airbag housing 13 as illustrated in FIG. 5. The airbag cover 13 stores the airbag 20 when the airbag 20 is in its undeployed position (not illustrated), i.e., before a collision. The airbag housing 13 optionally includes a cover (not illustrated) that faces the occupant 14 during normal operating conditions. The airbag housing 13 optionally includes creases, seams, or other features that are designed to split or open when the airbag 20 activates, expands, and deploys during a collision.

Typically the airbag housing 13 would be fixed to and rotatable with the vehicle's steering wheel and thus its rotational position is controlled by the driver's movement of the steering wheel. The airbag housing 13 optionally may be configured to couple to or be coupled to a non-rotating hub 11, as illustrated in FIG. 5. As noted, the airbag 20 has a wedge-shaped profile intended to reduce head and chest loading. The wedge-shape of the airbag 20, however, may better provide those benefits when the upper portion 22 is oriented or otherwise substantially aligned with the occupant's head 15 and the lower portion 24 is oriented or otherwise substantially aligned with the occupant's chest or torso 16. A non-rotating hub 11 helps to maintain the orientation of the airbag housing 13 and the airbag 20 relative to the occupant 14 regardless of the orientation of the steering wheel 12 during a collision. In other words, the non-rotating hub 11 prevents the airbag housing 13 and the airbag 20 from rotating with the steering wheel 12. Thus, in the event a collision occurs when the steering wheel 12 is rotated, such as when an occupant or driver 14 is attempting to avoid the collision by making an evasive maneuver or turn, the non-rotating hub 11 allows the airbag 20 to still be properly oriented with respect to the occupant's head 15 and chest 16. However, when used with conventional rotating hubs the airbag 20 provides benefits since a normal straight-ahead orientation of the steering wheel and therefore upright position of the airbag is normally true in vehicle operation and collisions.

Figure 4:
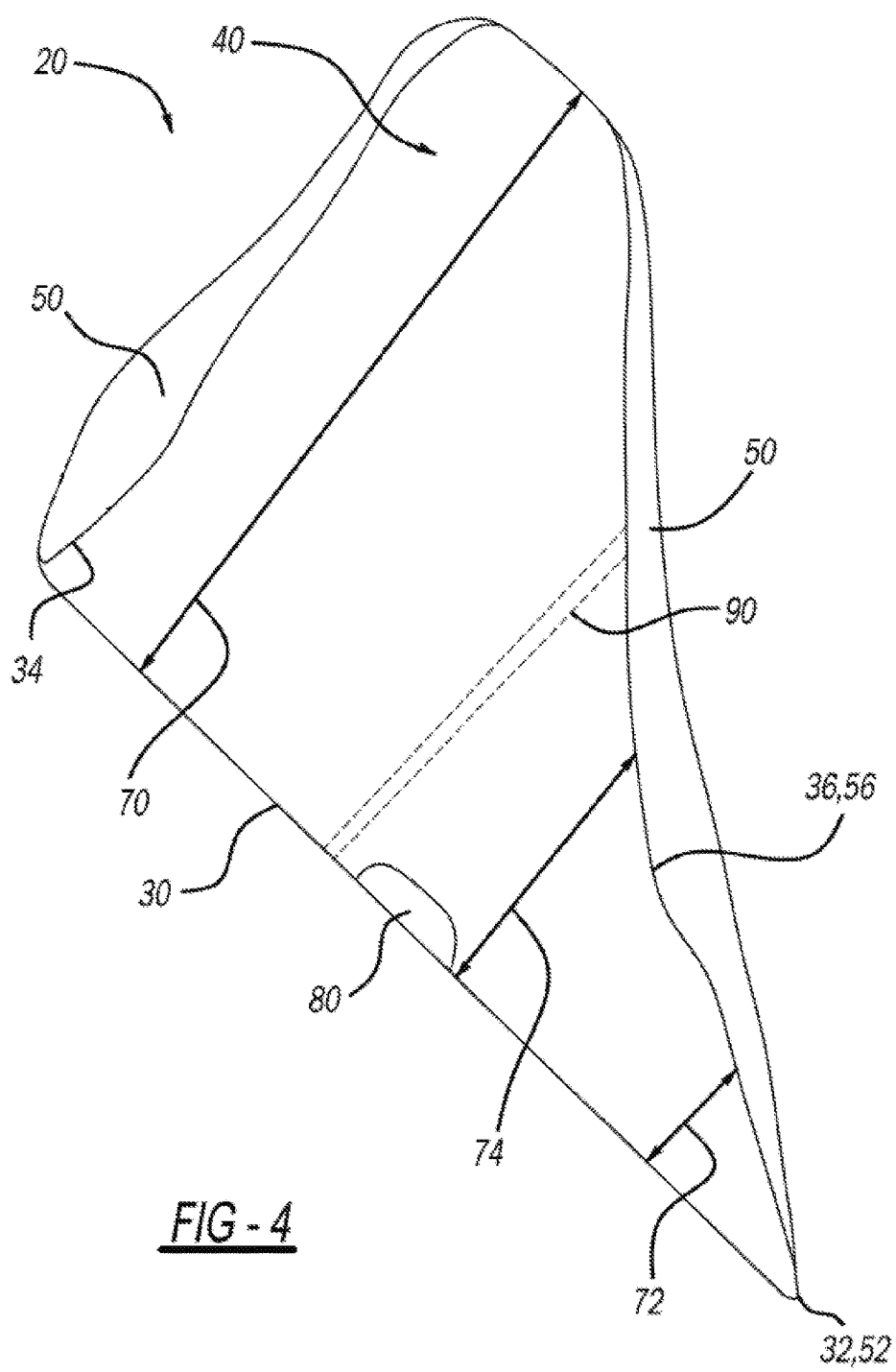
FIG. 4 is a perspective view of the airbag of FIG. 1 in an assembled condition.

The airbag 20 also optionally includes an inflator 80 coupled to a rear panel of the airbag 20, which in the illustrative example is first panel 30 in FIG. 4.

The airbag 20 includes a first panel 30 extending from a first base 32 with a first base width 33 to a first top 34 with a first top width 35. Optionally, the first top width 35 is greater than the first base width 33, although the first top width 35 may have the same width or be smaller than the first base width 33. Optionally, the first top width 35 is less than the sum of a first wing distance 45 and a second wing distance 46, which are discussed below. The first panel 30 may be generally rectangular, square, triangular, or other such shapes. For example, the first panel 30 optionally may include a trapezoid portion 37 proximate first base 32. Optionally, a shorter leg of the trapezoid portion 37 is the first base 32.

The first panel 30 may optionally be a front panel that faces towards the occupant 14 when the airbag 20 is in the deployed position 21 or the first panel 30 may be a rear panel that faces the steering wheel 12 when the airbag 20 is in the deployed position 21.

The first panel 30 may define a first centerline 38 that extends between a first base midpoint 31 of the first base width 33 and a first top midpoint 39 of the first top width 35.

The airbag 20 includes a second panel 50 extending from a second base 52 with a second base width 53 to a second top 54 with a second top width 55. Optionally, the second top width 55 is greater than the second base width 53, although the second top width 55 may have the same width or be smaller than the second base width 53. Thus, the second panel 50 may be generally rectangular, square, triangular, or other such shapes. For example, the second panel 50 optionally may include a trapezoid portion 57 proximate second base 52. Optionally, a shorter leg of the trapezoid portion 57 is the second base 52.

The second panel 50 may optionally be a front panel that faces towards the occupant 14 when the airbag 20 is in the deployed position 21 or the second panel 50 may be a rear panel that faces the steering wheel 12 when the airbag 20 is in the deployed position 21.

The second panel 50 includes a second centerline 58 that extends between a second base midpoint 51 of the second base width 53 and a second top midpoint 59 of the second top width 55.

Figure 2:
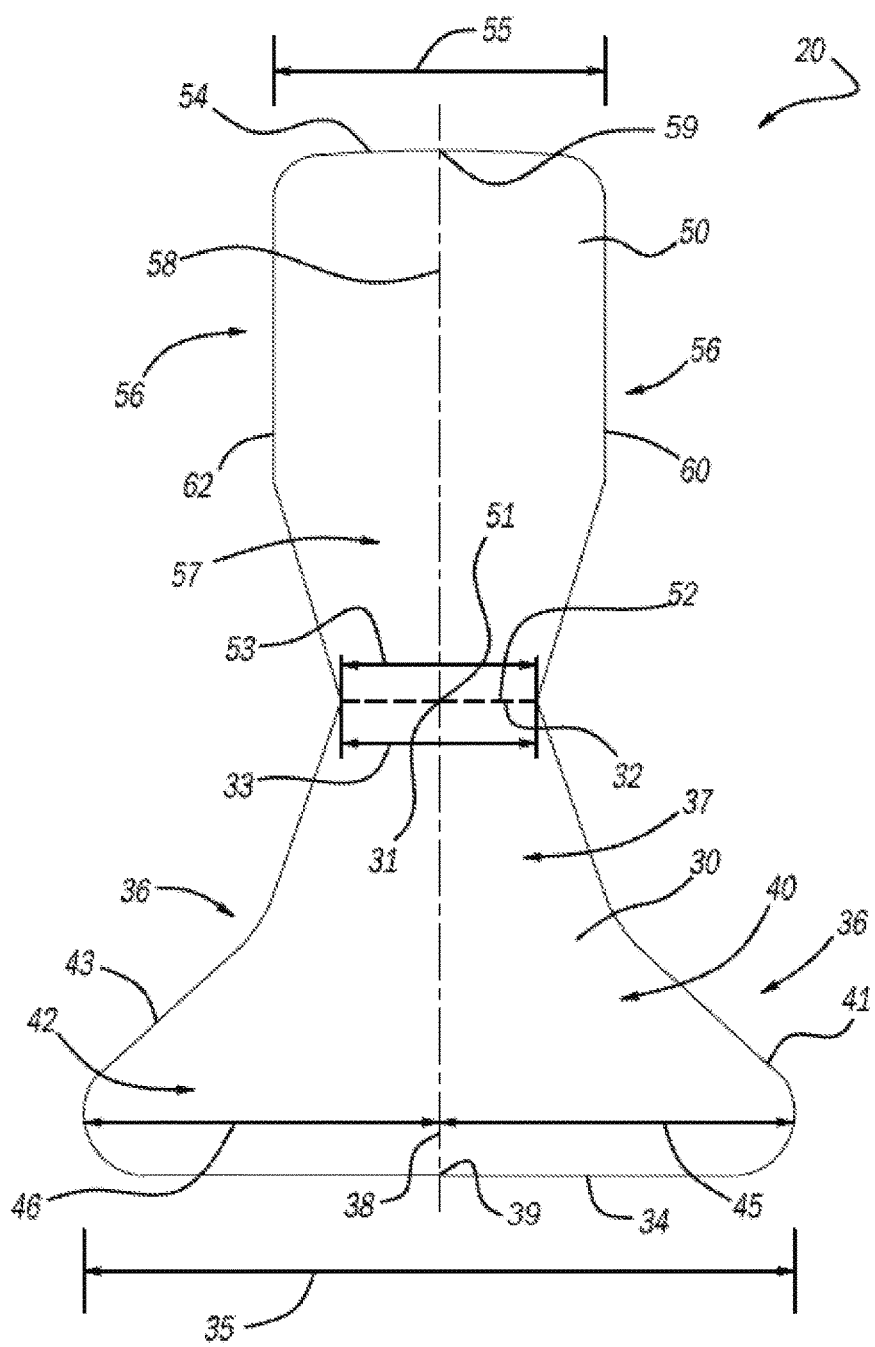
FIG. 2 is a top view of the airbag of FIG. 1 in a partially assembled condition.

The airbag 20 includes a first side 60 and a second side 62 space apart from the first side 60. Optionally, one or both of the first side 60 and the second side 62 extends from one of (a) the first base 32 to the first top 34 or (b) the second base 52 to the second top 54. As illustrated in FIG. 2, the first side 60 and the second side 62 extend from the second base 52 to the second top 54 of the second panel 50.

The airbag 20 also includes a first wing 40. The first wing 40 may be part of one of the first panel 30 and the second panel 50. As illustrated in FIG. 2, the first wing 40 is part of the first panel 30. Optionally, the first wing 40 is integrally formed with one of the first panel 30 and the second panel 50, or it may be otherwise coupled or affixed to the first panel 30 and the second panel 50. The first wing 40 is optionally coupled to the other of the first panel 30 or the second panel 50 along its periphery 41 to form, in part, the three-dimensional wedge shape of the airbag 20. Optionally, the first wing 40 is configured to extend in a direction away from the steering wheel 12 when the airbag 20 is in the deployed position 21.

Optionally, the first wing 40 extends a first wing distance 45 laterally away from one of the first centerline 38, as illustrated in FIG. 2, and the second centerline 58. The first wing 40 also extends from the first base 32 or the second base 52 to whichever of the first top 34 and the second top 54 associated with the first centerline 38 and the second centerline 58 from which the first wing 40 extends.

The airbag 20 also includes a second wing 42. The second wing 42 may be part of one of the first panel 30 and the second panel 50. As illustrated in FIG. 2, the second wing 42 also is part of the first panel 30. Optionally, the second wing 42 is integrally formed with one of the first panel 30 and the second panel 50, or it may be otherwise coupled or affixed to the first panel 30 and the second panel 50. The second wing 42 is optionally coupled to the other of the first panel 30 or the second panel 50 along its periphery 43 to form, in part, the three-dimensional wedge shape of the airbag 20. Optionally, the second wing 42 is configured to extend in a direction away from the steering wheel 12 when the airbag 20 is in the deployed position 21.

Optionally, the second wing 42 extends a second wing distance 46 laterally away from one of the first centerline 38, as illustrated in FIG. 2, and the second centerline 58. The second wing 42 also extends from the first base 32 or the second base 52 to whichever of the first top 34 and the second top 54 associated with the first centerline 38 and the second centerline 58 from which the second wing 42 extends.

The first wing 40 and the second wing 42 may have any particular shape, such as triangles, wedges, ovals, squares, rectangles, trapezoids, cones, and other such shapes. Furthermore, the first wing 40 and the second wing 42 may be shaped differently from each other as each extends away from either the first panel 30 and/or the second panel 50. The shape of the first wing 40 and the second wing 42 are configured to provide a first depth 70 extending from the first panel 30 to the second panel 50 proximate the first wing 40 and the second wing 42 when the airbag 20 is in the deployed position 21 and at least a second depth 72 extending from the first panel 30 to the second panel 50 proximate the first base 32, wherein the second depth 72 is less than the first depth 70 when the airbag 20 is in the deployed position 21. Optionally, the first depth 70 is equal to approximately the first top width 35 minus the second top width 55, and for which approximately means plus or minus 20 percent of the difference.

Optionally, the shape of the first wing 40 and the second wing 42 are configured to provide a third depth 74 extending from the first panel 30 to the second panel 50 at a position between the first depth 70 and the second depth 72, wherein the third depth 74 is less than the first depth 70 and greater than the second depth 72.

As previously noted, the first panel 30 and the second panel 50 may be formed of a single piece of fabric material. The material may be any type of material that typically is used to form airbags. Optionally, in those instances in which the first panel 30 and the second panel 50 are contiguous or integral, the first base 32 and the second base 52 may also be contiguous and, optionally, form a fold line as illustrated by the broken line at the first base 32/second base 52 in FIG. 2. In other words, the second panel 50 optionally is folded over at the first base 32/second base 52.

In those instances in which the first panel 30 and the second panel 50 are separate pieces or separate panels of base material, the first base 32 is coupled or affixed to the second base 52 by stitching, welding, adhesives, or other methods of coupling airbag panels together. In similar manner, the first top 34 is coupled to the second top 54; the first wing 40 and the second wing 42 are coupled to the first panel 30 and the second panel 50; and, the first side 60 and the second side 62 are coupled to the first panel 30 and the second panel 50 and, optionally, to the first wing 40 and the second wing 42. Optionally, the periphery 36 of the first panel 30 is coupled or affixed to the periphery 56 of the second panel 50, wherein the periphery 36 and the periphery 56 encompass the area proximate an edge of each of the constituent parts of the first panel 30 and the second panel 50, respectively.

Figure 3:
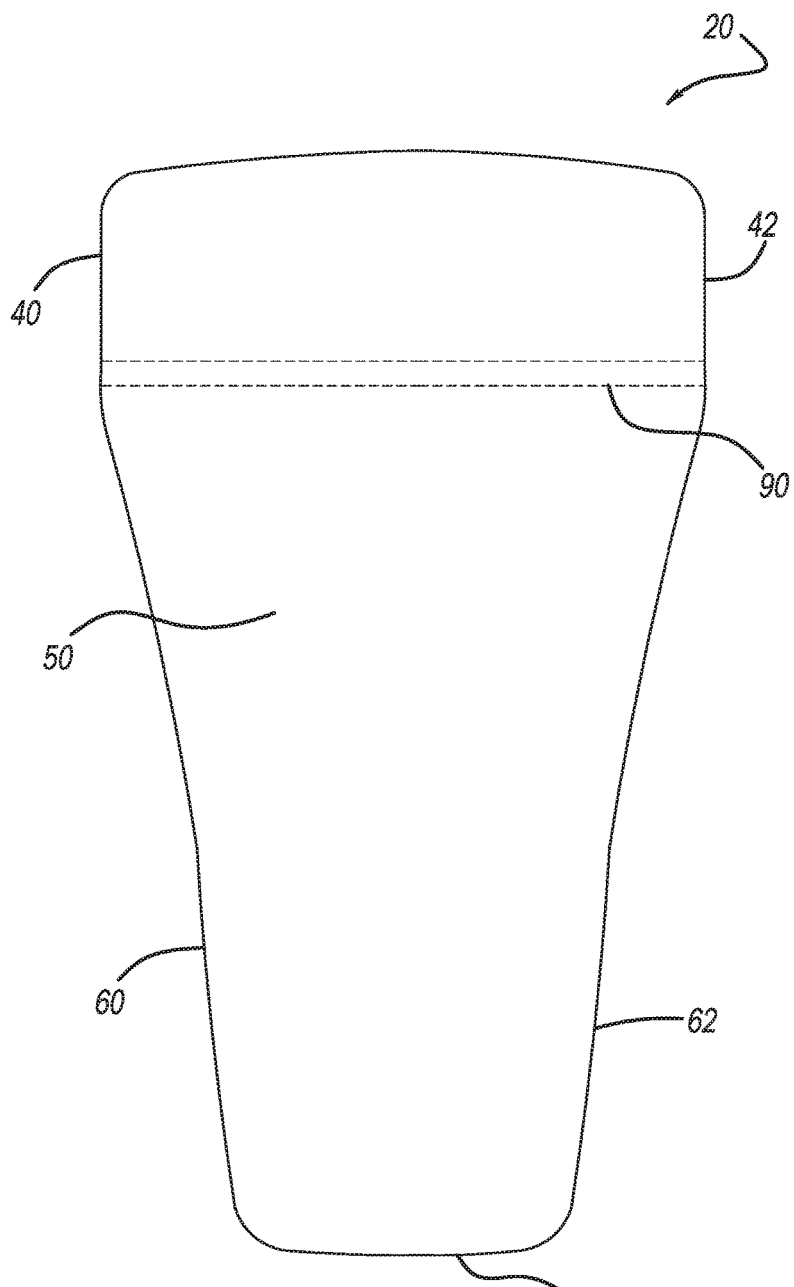
FIG. 3 is a front view the airbag of FIG. 1 in an assembled condition.

Optionally, the airbag 20 includes one or more tethers 90 that couple one or more of the (a) the first panel 30 to the second panel 50 or (b) the first wing 40 to the second wing 42, as illustrated in FIGS. 3 and 4. The tethers 90 are positioned internally to the first panel 30 and the second panel 50.

The airbag 20 also optionally includes one or more diffusers (not illustrated) positioned internally within the airbag 20.

The airbag 20 also optionally includes one or more portions (not illustrated) that are not inflated when the airbag 20 otherwise is in the deployed position 21.

Figure 6:
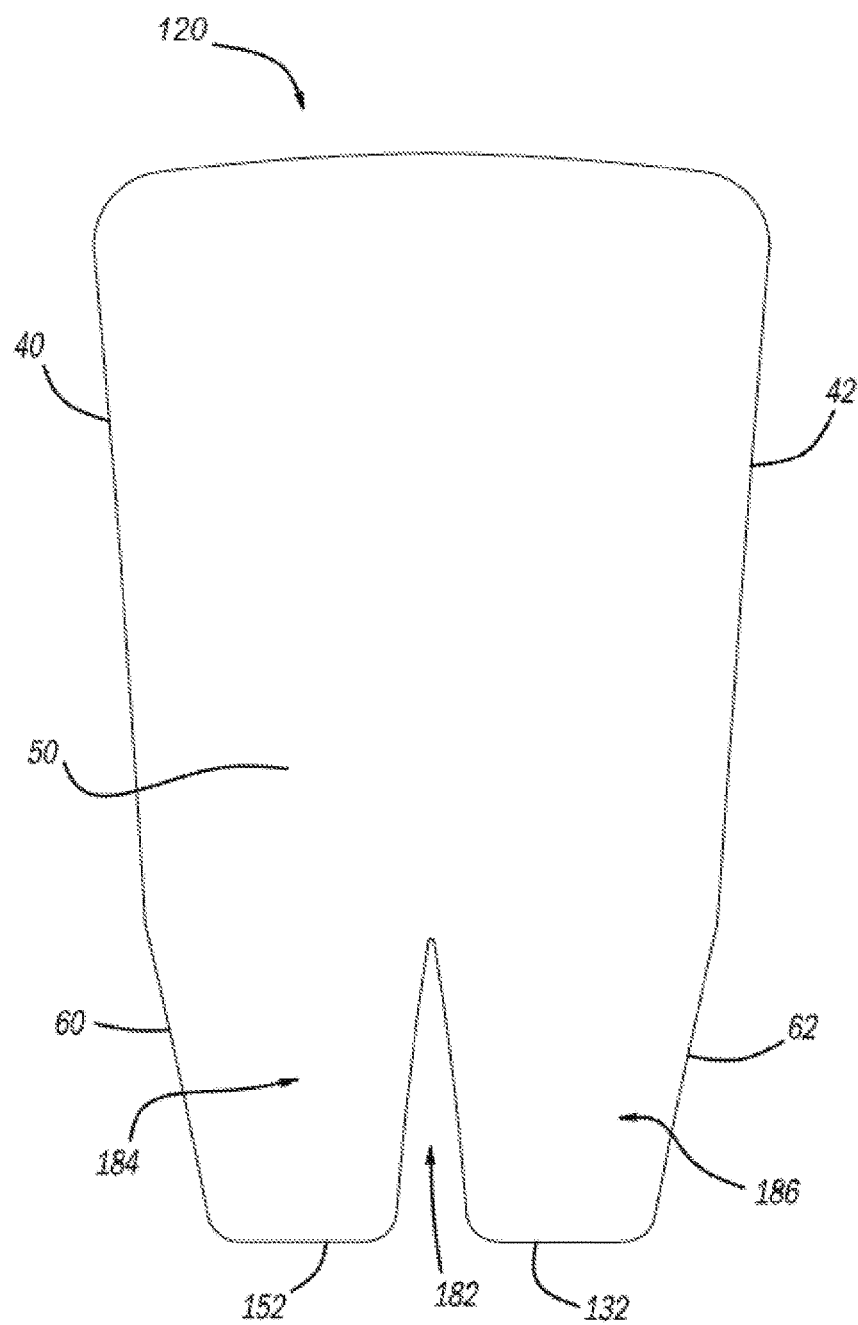
FIG. 6 is a front view of another embodiment of an airbag in accordance with the present invention in an assembled condition; and, FIG. 7 is a front view of the airbag of FIG. 6 in a deployed position.
Figure 7:
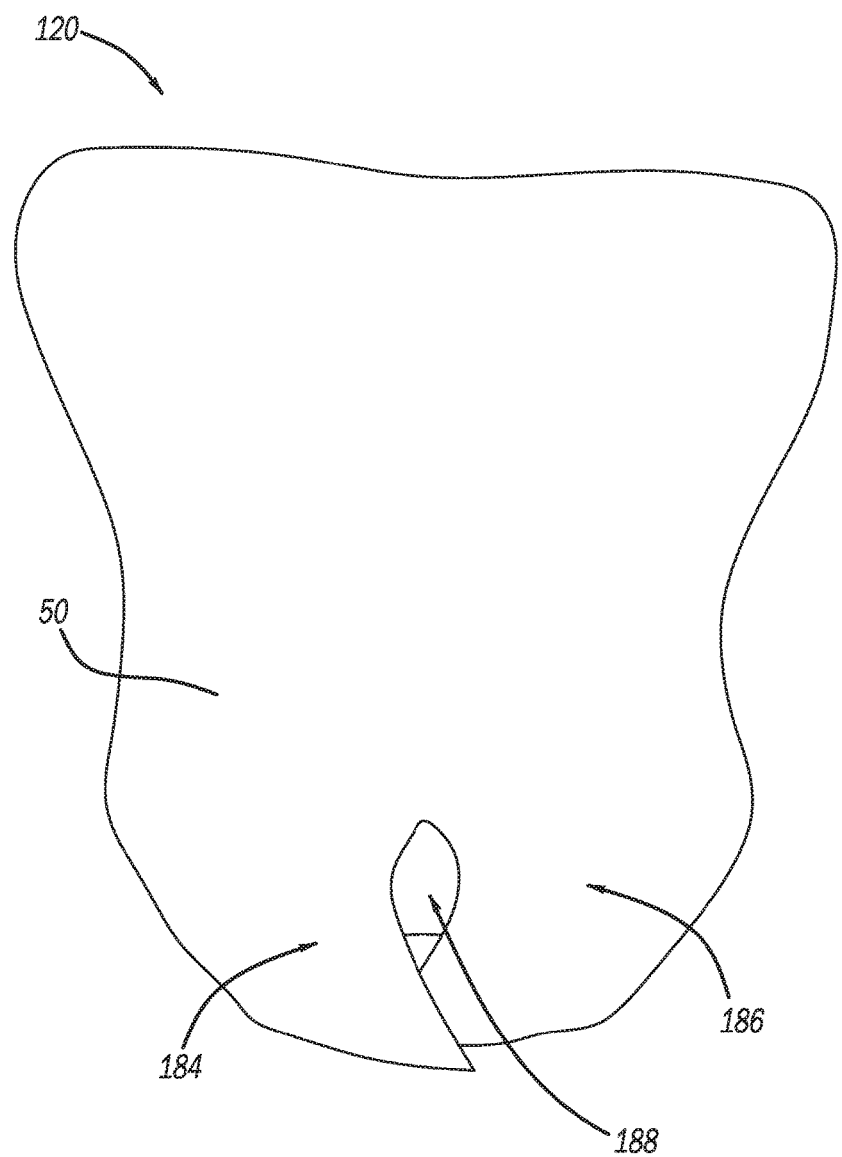

FIGS. 6 and 7 illustrate another embodiment of an airbag 120. The features of the airbag 20 and the airbag 120 are for the most part common. In other words, the same element numbers as used above in relation to airbag 20 denote the same features of airbag 120 and, consequently, will not be described again. Further, the airbag 120 may use any of the features of the airbag 20 in any combination, even if they are not expressly recited below or identified in the figures.

A difference between airbag 20 and the airbag 120 is that at least one of the first base 132 and the second base 152 optionally includes at least one split 182 that separates each of the first base 132 and the second base 152 into at least two portions 184 and 186. In some embodiments, the at least two portions 184 and 186 overlap when the airbag 120 is in the deployed position 21, as illustrated in FIG. 7. Furthermore, airbag 120 optionally includes at least one region 188 that is not inflated when the airbag 120 is in the deployed position 21.

Methods of forming the various embodiments of the airbags are also disclosed in the numbered embodiments and as would be understood by one of skill in the art.

While particular elements, embodiments, and applications of the present invention have been shown and described, it is understood that the disclosure is not limited thereto because modifications may be made by those skilled in the art, particularly in light of the foregoing teaching. It is therefore contemplated by the appended claims to cover such modifications and incorporate those features which come within the spirit and scope of the disclosure.

The invention claimed is:

1. An airbag configured to be coupled to a steering wheel of a motor vehicle, the airbag comprising:
a first panel extending from a first base with a first base width to a first top with a first top width greater than the first base width, the first panel forming:
a first centerline that extends between a first base midpoint of the first base width and a first top midpoint of the first top width;
a second panel extending from a second base with a second base width to a second top with a second top width, the second panel including:
a second centerline that extends between a second base midpoint of the second base width and a second top midpoint of the second top width;
a first side that extends from the second base to the second top;
a second side spaced apart from the first side, the second side extending from the second base to the second top;
a first wing extending a first wing distance laterally away from the first centerline in a first direction, the first wing extending from the first top to the first base; and
at least a second wing extending a second wing distance laterally away from the first centerline in a second direction opposite the first direction, the second wing extending from the first top to the first base;
wherein the second base is coupled to the first base, the second top is coupled to the first top, the first side is coupled to the first wing and the second side is coupled to the second wing, and
wherein the first panel and the second panel are formed from a contiguous piece of a material adjoining at the first base and the second base, and a lateral shape of each of the first panel and the second panel are asymmetric about the first base or the second base.

2. The airbag of claim 1, further comprising a non-rotating hub configured to couple to an airbag housing for the airbag.

3. The airbag of claim 1, further comprising an airbag housing configured to receive and to store the airbag when the airbag is in an undeployed condition.

4. The airbag of claim 1, wherein the first wing and the second wing are configured to extend in a direction away from the steering wheel when the airbag is in a deployed position.

5. The airbag of claim 1, further comprising an inflator coupled to the first panel.

6. The airbag of claim 1, further comprising a first depth extending from the first panel to the second panel proximate the first wing and the second wing when the airbag is in a deployed position and at least a second depth extending from the first panel to the second panel proximate the first base and the second base, wherein the second depth is less than the first depth.

7. The airbag of claim 6, further comprising a third depth extending from the first panel to the second panel at a position between the first depth and the second depth, wherein the third depth is less than the first depth and greater than the second depth.

8. An airbag configured to be coupled to a steering wheel of a motor vehicle, the airbag comprising:
a first panel extending from a first base with a first base width to a first top with a first top width greater than the first base width;
a second panel extending from the first base to a second top with a second top width, the second top being coupled to the first top;
a first wing integrally formed with one of the first panel and the second panel, the first wing being coupled to the other of the first panel and the second panel;
at least a second wing integrally formed with one of the first panel and the second panel, the second wing being coupled to the other of the first panel and the second panel; and
a first depth extending from the first panel to the second panel proximate the first wing and the second wing when the airbag is in a deployed position, at least a second depth extending from the first panel to the second panel proximate the first base, and a third depth extending from the first panel to the second panel at a position between the first depth and the second depth, wherein the second depth is less than the first depth, and third depth is less than the first depth and greater than the second depth; and,
wherein the first, second, and third depths form a three-dimensional wedge shape of the airbag.

9. The airbag of claim 8, wherein the first panel further comprises a first centerline that extends between a first base midpoint of the first base width and a first top midpoint of the first top width; wherein the second panel further comprises a second centerline that extends between the first base midpoint and a second top midpoint of the second top width;
wherein the first wing extends a first wing distance laterally away from one of the first centerline and the second centerline, the first wing extending from the first base to whichever of the first top and the second top associated with the first centerline and the second centerline from which the first wing extends; and,
wherein the second wing extends a second wing distance laterally away from one of the first centerline and the second centerline in a direction away from the first wing, the second wing extending from the first base to whichever of the first top and the second top associated with the first centerline and the second centerline from which the second wing extends.

10. The airbag of claim 8, wherein at least one of the first wing and the second wing are configured to extend in a direction away from the steering wheel when the airbag is in the deployed position.

11. The airbag of claim 8, wherein the first panel and the second panel are formed of a contiguous piece of a material.

12. The airbag of claim 8, wherein the first panel faces the steering wheel when the airbag is in the deployed position.

13. An airbag with an airbag housing configured to be coupled to a steering wheel of a motor vehicle, the airbag comprising:
a first panel extending from a first base with a first base width to a first top with a first top width greater than the first base width, the first panel including:

a first centerline that extends between a first base midpoint of the first base width and a first top midpoint of the first top width;
a second panel extending from the first base to a second top with a second top width, the second top being coupled to the first top, the second panel including:
a second centerline that extends between the first base midpoint and a second top midpoint of the second top width;
a first wing coupled to the first panel and the second panel, the first wing extending a first wing distance laterally away from one of the first centerline and the second centerline, the first wing extending from the first base to whichever of the first top and the second top associated with the first centerline and the second centerline from which the first wing extends; and,
at least a second wing coupled to the first panel and the second panel, the second wing extending a second wing distance laterally away from one of the first centerline and the second centerline in a direction away from the first wing, the second wing extending from the first base to whichever of the first top and the second top associated with the first centerline and the second centerline from which the second wing extends,
wherein at least one of the first wing and the second wing is coupled integrally with the first panel to form, in part, a three-dimensional wedge shape of the airbag, which is stored in the airbag housing directly coupled to the steering wheel when the airbag is undeployed.

14. The airbag of claim 13, wherein at least one of the first wing and the second wing are configured to extend in a direction away from the steering wheel when the airbag is in a deployed position.

15. The airbag of claim 13, wherein the first panel and the second panel are formed of a contiguous piece of a material.

16. The airbag of claim 13, further comprising a first depth extending from the first panel to the second panel proximate the first wing and the second wing when the airbag is in a deployed position and at least a second depth extending from the first panel to the second panel proximate the first base, wherein the second depth is less than the first depth.

* * * * *